Patented Feb. 20, 1951

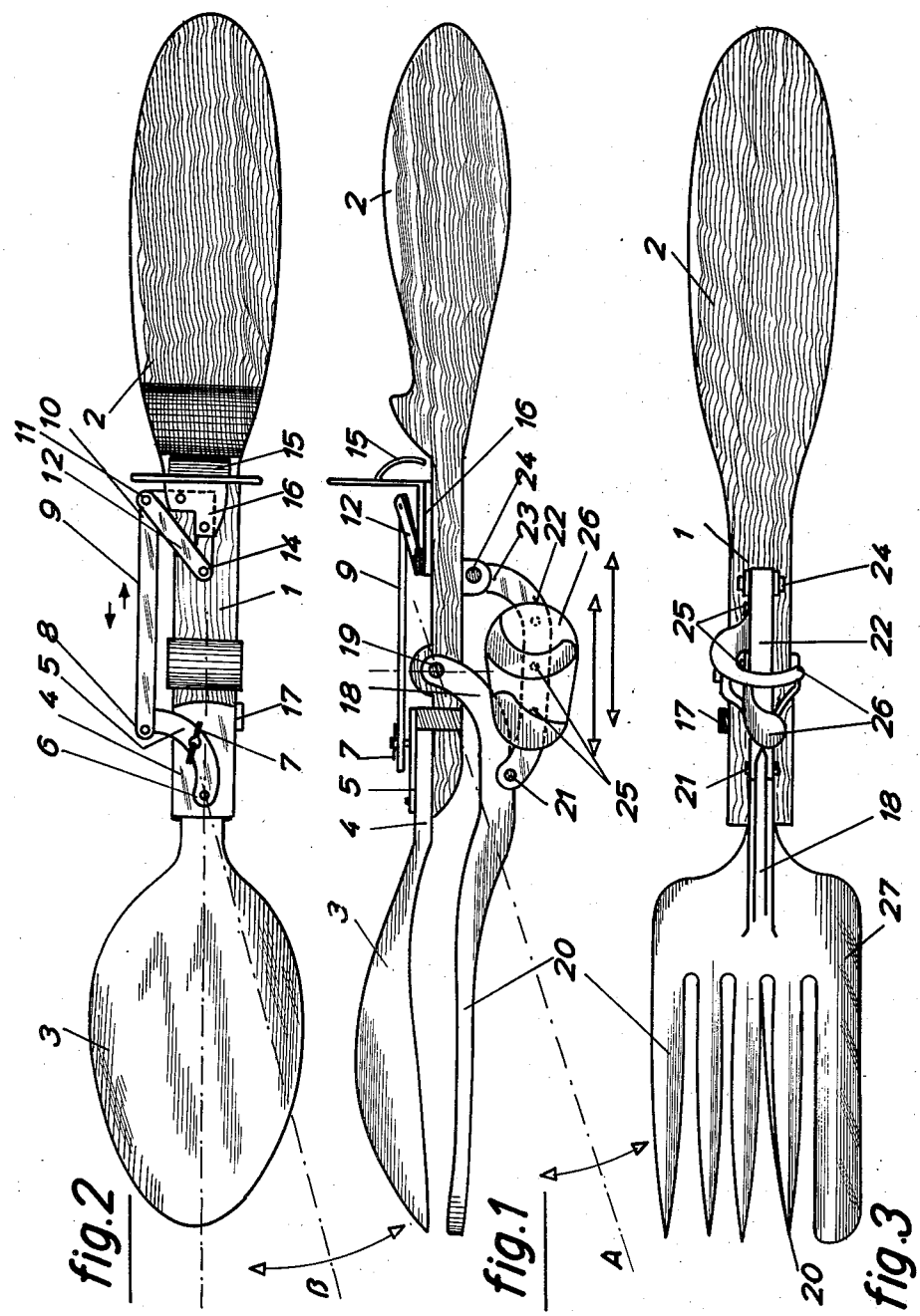

2,542,600

UNITED STATES PATENT OFFICE 2,542,600

TABLE SERVICE UTENSIL

Ismael José Vaccarezza, Daireaux, Argentina

Application July 15, 1948, Serial No. 38,775
In Argentina November 14, 1947

2 Claims. (Cl. 30—147)

This invention relates to a utensil combining a fork, knife and spoon to produce an instrument for serving different kinds of food, and for permitting each element of the combination to have a degree of operative independence. At any one time the spoon and fork can act simultaneously.

In the serving of food, it is customary to use a spoon and fork simultaneously in a single hand for removing food from a dish, otherwise supported. This operation, apparently simple, presents many difficulties, due to diversity in nature or presentation of food. Lack of practice often necessitates operations for food division not easily and neatly performed.

The device of this invention facilitates these fork and spoon operations and also allows the joint use therewith of a knife, an utensil hitherto separately employed.

Reference is made to the accompanying drawings wherein:

Figure 1 is a longitudinal side view of this device,

Figure 2 is a bottom plan view of this device, and

Figure 3 is a top plan view of a fork and knife combination.

Element 1, of rectangular section and formed of plastic, wood, metal, or the like, is the carrier of all the utensils and the operating mechanism therefor. At one end element 1 is expanded into a handle 2, or this last may be formed separately and fastened to element 1. The spoon 3 is mounted at the other end of element 1, a prolongation 4 and coupling member 5 affording connection of these elements by means of pin 6 and screw 7. One end of member 5 projects toward the rear of the device, where it is hinged by pin 8 to bar 9. The other end of bar 9 is hinged by pin 11 to a lever 12, this last rotating upon a pin 14. A small stop 17 is arranged at the side of element 1, to contact element 4, so as to limit the angular trajectory of spoon 3 to one side only.

Upon the opposite face of element 1, a forked bar 18 is hinged to element 1, by pin 19. The other end of bar 18 is integral with the fork and knife 20. Toward the center of bar 18 is hinged saddle element 22, of L-shape, by means of pin 21. The end 23 of this last element is articulated to element 1, by pin 24.

On one side of element 22, an operative thimble 26 is firmly held by rivets 25. A ring 15 is supported on a bent angle piece 16, thereby serving to actuate the relative motion of the utensils.

One side of fork and knife 20 has a bevelled edge 27, preferably of steel, and sufficiently hardened to function as a knife.

This device functions as follows: Handle 2 is grasped in the right hand, the forefinger is put in the ring 15 and the thumb into thimble 26, allowing food to be seized. The spoon can be held as shown in Figure 1, whereby small angular movement will be imparted to the fork, as indicated by the dotted line A. Since levers 22 and 18 give a rapid pincers movement, the desired result is easily obtained. To cut food, spoon 3 is raised by means of the operative levers, allowing cutting to be made by the bevelled knife edge 27. Functioning of spoon 3 is obtained, as shown in Figure 2, by the control action which causes assumption of the position shown by dotted line B.

I claim:

1. A poly-functional table service utensil, partaking simultaneously of the operative characteristics of both a fork and a spoon, including a spoon element concavely recessed, and a fork element formed as a multi-tined fork and positioned adjacent said spoon element in such fashion that the substantially plane surface of one side of said fork element is juxtaposed to the concavely recessed side of said spoon element, a single handle fashioned for manually grasping thereof and operatively connected both to said spoon and said fork elements via an intermediary element possessed of a generally rectangular configuration, means whereby said spoon element is rotatively mounted upon an axis located near one extremity of said intermediate element, a linkage system comprising three levers, an operative ring actuating said levers and disposed adjacent the other extremity of said intermediate element, means including a first articulated arm for holding said fork element opposite said spoon element, a second arm and a pin articulating said second arm upon said intermediate element, and an operative thimble located upon one side of said second arm.

2. An utensil according to claim 1, also including a lateral stop situated closely adjacent the extremity of said rectangular intermediate element which is nearest said spoon element.

ISMAEL JOSÉ VACCAREZZA.

REFERENCES CITED

The following references are of record in the file of this patent:

UNITED STATES PATENTS

| Number | Name | Date |
|---|---|---|
| 1,294,031 | Bigelow | Feb. 11, 1919 |
| 2,456,858 | Bolling | Dec. 21, 1948 |

FOREIGN PATENTS

| Number | Country | Date |
|---|---|---|
| 327,569 | Great Britain | Apr. 10, 1930 |